(12) United States Patent
Ruuskanen

(10) Patent No.: US 9,175,851 B2
(45) Date of Patent: Nov. 3, 2015

(54) METHOD OF AND AN ARRANGEMENT FOR RECOVERING HEAT FROM BOTTOM ASH

(75) Inventor: Marko Ruuskanen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 618 days.

(21) Appl. No.: 13/512,641

(22) PCT Filed: Dec. 14, 2010

(86) PCT No.: PCT/FI2010/051021
§ 371 (c)(1),
(2), (4) Date: Jul. 17, 2012

(87) PCT Pub. No.: WO2011/076994
PCT Pub. Date: Jun. 30, 2011

(65) Prior Publication Data
US 2012/0276492 A1    Nov. 1, 2012

(30) Foreign Application Priority Data
Dec. 21, 2009 (FI) ...................................... 20096376

(51) Int. Cl.
*F27B 15/09* (2006.01)
*F23J 1/02* (2006.01)
(Continued)

(52) U.S. Cl.
CPC ... *F23J 1/02* (2013.01); *F22B 1/04* (2013.01); *F23C 10/00* (2013.01); *F23J 2900/01002* (2013.01); *F23L 2900/15041* (2013.01)

(58) Field of Classification Search
USPC ........... 122/7 R, 31.1, 33, 34; 432/15, 58, 74; 48/73, 77, 87, 197 R, 210; 422/139, 422/145, 147
See application file for complete search history.

(56) References Cited

U.S. PATENT DOCUMENTS 2,635,587 A    4/1953  Dalin et al.
3,202,134 A *  8/1965  Marcheix ...................... 122/1 R
(Continued)

FOREIGN PATENT DOCUMENTS

CA    1261204 A1    9/1989
CN    2047335 U     11/1989
(Continued)

OTHER PUBLICATIONS

Finnish Office Action dated Oct. 22, 2010, issued in counterpart Finnish patent application No. 20096376.
(Continued)

*Primary Examiner* — Gregory A Wilson
(74) *Attorney, Agent, or Firm* — Fitzpatrick, Cella, Harper & Scinto

(57) ABSTRACT

A method of recovering heat from bottom ash that is discharged from a combustion process in a furnace. Fuel and combustion air are fed into a furnace for combusting the fuel in order to generate heat energy to produce at least one of steam and hot water in a boiler arrangement, in which flue gases and bottom ash are generated. The bottom ash is discharged from the furnace. Heat is recovered from the flue gases. Heat is also recovered to a bottom ash cooling circuit from the bottom ash discharged from the furnace in order to utilize the recovered heat for preheating the combustion air in a heat exchanger. The heat exchanger is arranged in a combustion air heating circuit. Heat is exchanged from the bottom ash cooling circuit to the combustion air heating circuit.

18 Claims, 5 Drawing Sheets

(51) Int. Cl.
*F22B 1/04* (2006.01)
*F23C 10/00* (2006.01)

(56) References Cited

U.S. PATENT DOCUMENTS

| | | | |
|---|---|---|---|
| 4,213,402 A | | 7/1980 | Kochey |
| 4,461,629 A | * | 7/1984 | Arisaki .................... 48/210 |
| 5,320,070 A | | 6/1994 | Kienböck et al. |
| 5,624,469 A | * | 4/1997 | Isaksson et al. ................ 48/87 |
| 5,840,258 A | * | 11/1998 | Hyppanen .................. 422/142 |
| 5,954,000 A | * | 9/1999 | Panos ...................... 110/165 R |
| 6,532,905 B2 | | 3/2003 | Belin et al. |
| 7,146,915 B2 | | 12/2006 | Magaldi |
| 7,464,669 B2 | * | 12/2008 | Maryamchik et al. ........ 122/4 D |
| 2007/0266915 A1 | | 11/2007 | Roppo et al. |
| 2007/0283902 A1 | | 12/2007 | Maryamchik et al. |

FOREIGN PATENT DOCUMENTS

| | | |
|---|---|---|
| CN | 2216196 Y | 12/1995 |
| CN | 2259605 Y | 8/1997 |
| CN | 2337411 Y | 9/1999 |
| CN | 2434538 Y | 6/2001 |
| CN | 1636121 A | 7/2005 |
| CN | 2821399 Y | 9/2006 |
| CN | 201344546 Y | 11/2009 |
| DE | 232 747 A1 | 2/1986 |
| EP | 0 417 055 A1 | 3/1991 |
| EP | 0467913 A1 | 1/1992 |
| EP | 1 857 738 A2 | 11/2007 |
| FI | 86219 | 10/1990 |
| FI | 118307 B | 9/2007 |
| GB | 629298 | 9/1949 |
| JP | 7-174326 A | 7/1995 |
| JP | 7-324725 A | 12/1995 |
| JP | 8-49834 A | 2/1996 |
| JP | 9-112802 A | 5/1997 |
| JP | 9-133318 A | 5/1997 |
| JP | H09-112802 A | 5/1997 |
| JP | H09-133318 A | 5/1997 |
| JP | 9-189408 A | 7/1997 |
| JP | H09-189408 A | 7/1997 |
| JP | 2005-520112 A | 7/2005 |
| JP | 2005-282363 A | 10/2005 |
| WO | 03/071189 A1 | 8/2003 |
| WO | 2007/134874 A1 | 11/2007 |
| WO | 2009/149310 A1 | 12/2009 |

OTHER PUBLICATIONS

Notification of and International Search Report mailed Apr. 13, 2011, in counterpart International Application No. PCT/FI2010/051021.
Written Opinion of the International Searching Authority mailed Apr. 13, 2011, in counterpart International Application No. PCT/FI2010/051021.
Notification of and International Preliminary Report on Patentability dated May 15, 2012, issued in a communication mailed May 14, 2012, in counterpart International Application No. PCT/FI2010/050862.
Written Opinion completed Jan. 18, 2011, and issued in a communication mailed Feb. 24, 2011, in counterpart International Application No. PCT/FI2010/050862.
Finnish Opposition issued by the Finnish Patent Office on Jul. 4, 2012, in counterpart Finnish Patent No. 122189, with an English translation.
Public use document made available for public inspection in Belgium when constructing Langerbrugge power plant. To support the public use, a general description of the power plant, parts of the power plant blue prints, and a description of the dates related to the public use are disclosed.
"RDF CFBF Boiler Technology," International Seminar on Waste-to-Energy, Korean District Heating Engineering Co., Ltd., Oct. 15, 2009, pp. 81, 85 and 86.
Babcock Borsig Service, Sales Brochure (two pages), 2002.
Huhtinen, Markku, et al., "Steam Boiler Technology," Opetushallitus, 1994, pp. 180, 181 and 185, with an English translation.
Chinese Official Action dated Dec. 12, 2013, issued in counterpart Chinese Patent Application No. 201080058810.2, with an English translation.
Japanese Official Action dated Oct. 1, 2013, issued in counterpart Japanese Patent Application No. 2012-545364, with an English translation.
Communication and Supplementary Search Report completed Dec. 23, 2014, and mailed Jan. 13, 2015, in counterpart European Patent Application No. 10838743.2-1602/2516927.
Korean Official Action dated Mar. 31, 2014, issued in counterpart Koran Patent Application No. 10-2012-7016292, with an English translation.

* cited by examiner

METHOD OF AND AN ARRANGEMENT FOR RECOVERING HEAT FROM BOTTOM ASH

This application is a U.S. national stage application of PCT International Application No. PCT/FI2010/051021, filed Dec. 14, 2010, published as International Publication No. WO 2011/076994 A1, and which claims priority from Finnish patent application number 20096376, filed Dec. 21, 2009.

FIELD OF THE INVENTION

The present invention relates to a method of and an arrangement for recovering heat from bottom ash of a combustion process performed in a combustion device, from which bottom ash is removed at a high temperature. The present invention is specifically applicable to bubbling bed boilers, fluidized bed boilers, and circulating fluidized bed boilers.

BACKGROUND OF THE INVENTION

An ordinary boiler arrangement of the prior art is comprised of a furnace to which fuel, bed material, and combustion air are introduced. When combusting the fuel, heat is generated and both bottom ash and flue gases are formed. The flue gases are taken to a separator that separates solid particles from the gases, and with the solid particles being returned back to the furnace. Both the furnace and the separator are provided with heat exchange surfaces comprising water or steam tubes to collect heat from the flue gases and the solids moving in the boiler. The flue gases are taken from the separator to further heat recovery devices, such as superheaters or reheaters, where the heat still available in the flue gases is used to further heat the steam. The heat is transferred into use, such as, for instance, for generating electricity by means of steam turbines and generators, in the form of high temperature steam. After the superheaters and reheaters, the flue gases flow through an economizer that, again, collects heat from the flue gases to boiler feed water, i.e., water or condensate that is returning to the boiler from the use, for instance, from the turbines. The most often final step of collecting heat from the flue gases takes place in the combustion air preheater, where the flue gas heat is used to heat the air that is used as combustion air in the furnace. The preheater is normally a rotary or tubular preheater. The combustion air preheater is followed in the flue gas path by an electrostatic filter/precipitator that separates any solid particles left in the flue gases before the flue gases are vented to the atmosphere by means of a flue gas fan via a stack.

The boiler feed water entering the economizer originates, typically, as already mentioned above, from the use in steam turbines and a condensor downstream of the steam turbines. The condensate is first heated by steam extracted from the steam turbines by means of one or more low-pressure preheaters until the condensate is introduced into the feed water tank, which is used to deaerate the water, and sometimes, to heat the water further, before pumping it towards the economizer. The feed water pumped from the feed water tank by means of a pump may further be heated by means of a high pressure preheater before entering the economizer.

The bottom of the furnace is provided with a grid for introducing combustion or suspending or fluidizing gas, called primary or combustion air, into the furnace, and for removing ash and other debris from the furnace. The common name for the material discharged from the boiler furnace through the grid is bottom ash. It contains non-burning material, clinker, unburnt fuel particles, etc. Normally, the bottom ash is discharged in a water filled trough or to water- or air-cooled conveyors where it gets cooled. The cooled bottom ash is then taken out of the plant to be dumped, or sometimes used as construction material.

Thus, in conventional prior art boilers, the loss of heat energy in the discharge of the bottom ash forms a significant portion of boiler losses. This is even more so with certain high ash content fuels, i.e., when the estimated bottom ash content of the fuel is high or when there is a need to remove or to circulate coarse or otherwise inappropriate bed material from the furnace. The reason for the high loss of energy is that the bottom ash to be removed from the furnace is high in temperature, usually, about 700 to about 800° C. For example, if the bottom ash flow from the boiler is 10 kg/s at a temperature of 725° C., using the reference temperature of 25° C. and the heat capacity for ash of 1 kJ/kg, an energy loss of 7 MW while discharging bottom ash can be expected.

The prior art shows, however, a couple of systems in which some heat of the bottom ash is recovered. Published European Patent Application No. 0 471 055 B1 discloses a boiler arrangement in which the bottom ash is discharged from a grid area onto a moving, specifically-designed steel belt. The heat recovery is arranged such that cooling air is made to flow concurrent to the bottom ash flow and to the steel belt movement, so that the heated air finally enters the furnace.

Published International Patent Application No. WO 2007/134874 A1 discusses a boiler arrangement in which the steel belt bottom ash discharge of the above-referenced document is still used, as well as the countercurrent air flow. This publication, however, further teaches that, for cooling the bottom ash, water is sprayed on the bottom ash, so that the generated steam finally enters the furnace together with the heated air flow.

The heat recovery technology discussed in the above-mentioned patent documents, though teaching the possibility of recovering heat from the bottom ash discharge, is not that efficient. Especially, when a larger amount of bottom ash is discharged, it is clear that the countercurrent air flow is not able to cool the ash sufficiently. And, even if additional water spraying is used, there are two risks. The first is that the ash will not be cooled sufficiently, and secondly, if the ash is cooled sufficiently, there may be too much steam to be introduced into the furnace. Additionally, mostly due to the inefficiency of air acting as the heat transfer medium, the size of the devices functioning even in a satisfactory manner are very large, and expensive. And, further, to be able to cool the bottom ash sufficiently, a large amount of air is needed, the use of which as combustion air may interfere negatively with the combustion air system of the boiler.

SUMMARY OF THE INVENTION

Thus, an object of the present invention is to suggest a novel and an efficient method of cooling down the bottom ash discharged from the furnace.

Another object of the present invention is to take the heat recovered from the bottom ash into use in one or more appropriate positions in the power plant.

The above and other objects of the present invention are met with a method of recovering heat from bottom ash that is discharged from a combustion process in a furnace, the method comprising feeding fuel and combustion air into a furnace for combusting the fuel in order to generate heat energy to produce at least one of steam and hot water in a boiler arrangement, in which flue gases and bottom ash are generated, discharging the bottom ash from the furnace, recovering heat from the flue gases, and recovering heat to a bottom ash cooling water circuit from the bottom ash discharged from the furnace in order to utilize the recovered heat for preheating the combustion air in a heat exchanger.

Similarly, the above and other objects of the present invention are met with the arrangement for recovering heat from bottom ash that is discharged from a combustion process in a furnace of a boiler arrangement, in which fuel is combusted for generating heat to produce at least one of steam and hot water, and flue gases and bottom ash are generated. The arrangement includes a furnace for combusting fuel with combustion air in order to generate heat energy to produce at least one of steam and hot water in a boiler arrangement in which flue gases and bottom ash are generated, a feed for feeding combustion air into the furnace, a feed for feeding fuel into the furnace, a discharge for discharging the bottom ash form the furnace, a recovery device for recovering heat from the flue gases, and a bottom ash cooling water circuit adapted to recover heat from the bottom ash in order to utilize the recovered heat in a heat exchanger that exchanges heat from the circuit to the combustion air.

Other features of the method and the apparatus of the present invention can be seen in the appended claims.

The present invention has solved at least some problems relating to the prior art bottom ash cooling systems. For instance, the present invention makes it possible to recover heat efficiently from the bottom ash, and to utilize the recovered heat wherever needed in the power plant.

The present invention thus makes it possible to improve the efficiency of the boiler significantly. Also, the present invention takes, in any case required, the bottom ash cooling devices or arrangements into more efficient use, whereby the required investment is very low.

BRIEF DESCRIPTION OF THE DRAWINGS

In the following, the method and the arrangement of the present invention will be explained in more detail with reference to the following drawings, of which

DETAILED DESCRIPTION OF THE PREFERRED EMBODIMENTS

Figure 1:
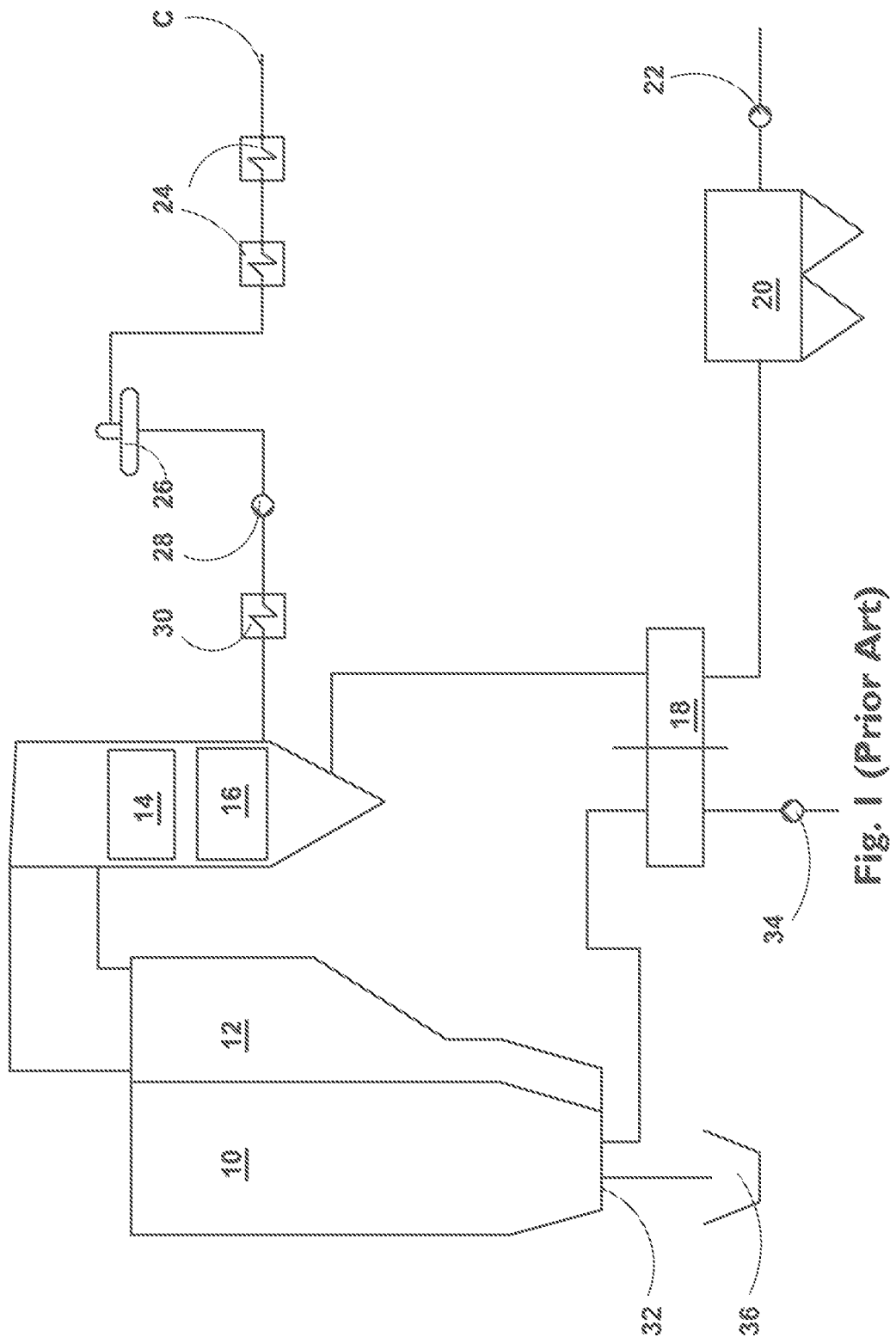
FIG. 1 is a schematic representation of a circulating fluidized bed boiler arrangement of the prior art.

FIG. 1 schematically illustrates, and, as an example only, an ordinary boiler arrangement of the prior art. A furnace to which the fuel, the bed material and the combustion air are introduced is denoted by reference numeral 10. When combusting the fuel in the furnace 10, heat is generated and both bottom ash and flue gases are formed. The gases are taken to a separator 12, which separates solid particles from the gases, and recirculates the solid particles back to the furnace 10. Both the furnace 10 and the separator 12 are provided with heat exchange surfaces comprising water tubes to collect heat from the flue gases and the solids moving in the furnace 10 and the separator 12. The flue gases are taken from the separator 12 to further heat recovery devices 14, such as superheaters and reheaters, where the heat still available in the flue gases is used to further heat steam. The heat is transferred into use, such as, for instance, for generating electricity by means of steam turbines and generators, in the form of high temperature steam. After the superheaters and reheaters 14, the flue gases flow through an economizer 16 that, again, collects heat from the flue gases to boiler feed water. The often final step of collecting heat from the flue gases takes place in the combustion air preheater 18, where the flue gas heat is used to heat the air that is used as combustion air in the furnace 10. The air preheater 18 is followed in the flue gas path by an electrostatic filter/precipitator or a bag filter 20 that separates any solid particles left in the flue gases before the flue gases are vented to the atmosphere by means of a flue gas fan 22 via a stack.

The boiler feed water entering the economizer 16 originates from the use in steam turbines and a condensor downstream of the steam turbines. The condensate C is first heated by steam by means of one or more low-pressure preheaters 24 until the condensate is introduced into the feed water tank 26, which is used to deaerate the water, and, sometimes, to heat the water before the water is pumped to the economizer 16. The feed water pumped from the feed water tank 26 by means of a pump 28 may further be heated by means of a high pressure preheater 30 before entering the economizer 16.

The bottom of the furnace 10 is provided with a grid 32, on the one hand, for introducing combustion or suspending or fluidizing gas, called primary air or combustion air, that is pumped into the furnace 10 by a fan 34 via the air preheater 18, and, on the other hand, for removing ash and other debris from the furnace 10. The material discharged from the furnace 10 through the grid 32 is commonly called bottom ash. The bottom ash contains non-burning material, clinker, unburnt fuel ash particles, etc. Normally, the bottom ash is discharged in a water filled trough 36 where it gets cooled. The cooled bottom ash is then taken out of the plant to be dumped, or sometimes used as construction material.

FIGS. 2-5 schematically illustrate several variations of the present invention arranged, in an exemplary manner, in connection with a circulating fluidized bed boiler, though the bottom ash cooling arrangement of the invention may as well be used in other boiler types in which bottom ash is discharged. A common feature to all embodiments of the present invention is that the bottom ash is discharged through the grid 32 to a bottom ash cooling device 38, preferably, a cooled transport screw arrangement driven by means of a motor 40. The cooled transport screw is normally provided with a water-cooled casing and a hollow shaft that allows cooling water flow therethrough. Other applicable bottom ash cooling device(s) 38 are water-cooled drum coolers, and water-cooled scraper conveyors, just to name a couple of alternatives. Another common feature to all illustrated embodiments of the present invention is that the water used for cooling the bottom ash in the cooling device(s) 38 is used for preheating the combustion air.

Figure 2:
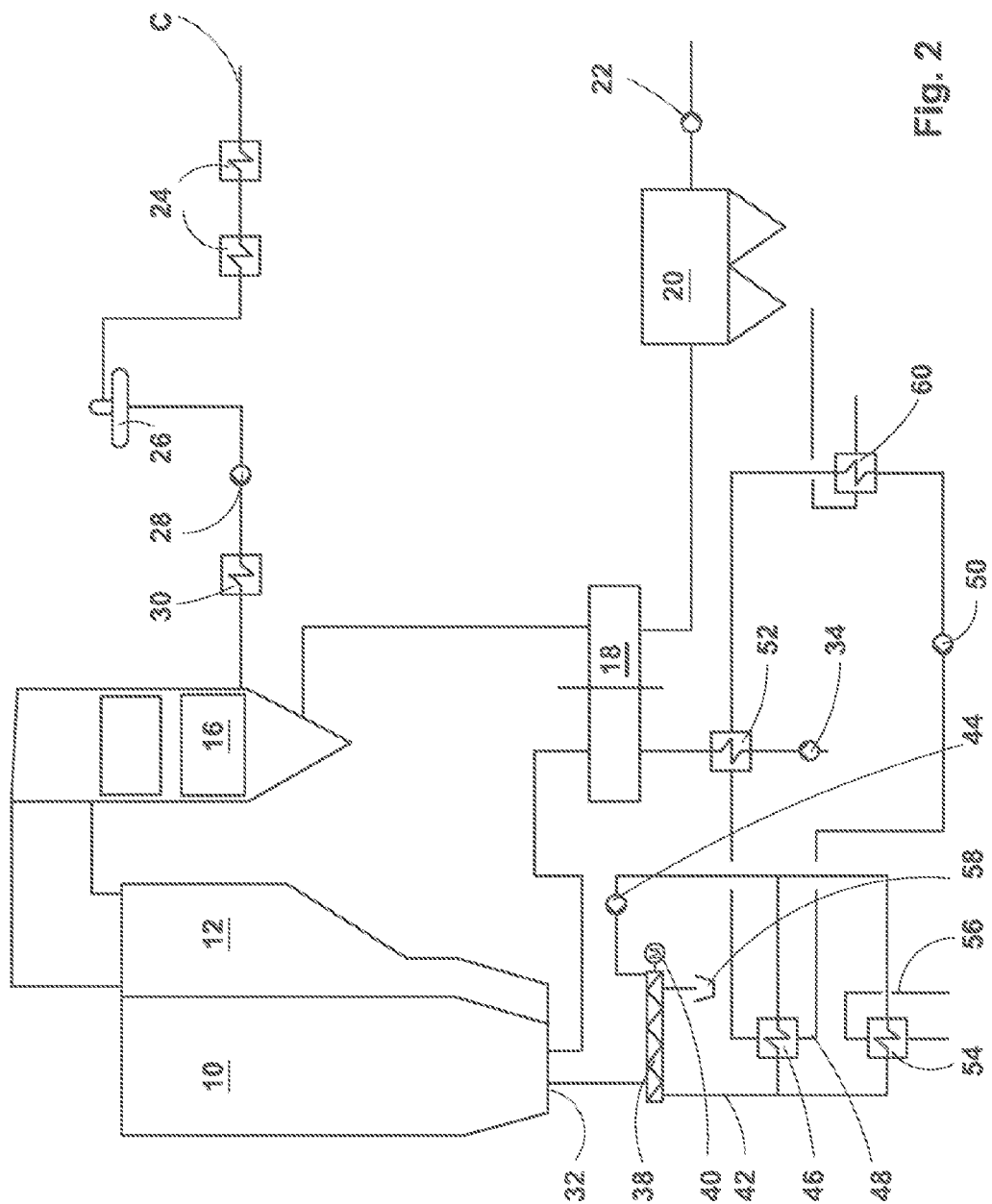
FIG. 2 is a schematic representation of a first preferred embodiment of the present invention, arranged in connection with a circulating fluidized bed boiler.

FIG. 2 illustrates a bottom ash heat recovery arrangement in accordance with a first preferred embodiment of the present invention. The bottom ash cooling device 38 is a portion of a bottom ash cooling circuit 42, which further comprises at least a circulation pump 44, and a heat exchanger 46. Thus, the heat from the bottom ash cooling water circulating in the cooling circuit 42 is transferred in heat exchanger 46 to a closed water circuit, i.e., a heating circuit 48 that includes, in addition to the heat exchanger 46, at least a circulation pump 50, and another heat exchanger 52. The heat collected in the heating circuit 48 is used for heating the combustion air by means of the heat exchanger 52. The heat exchanger 52 is positioned between the combustion air fan 34 and the air preheater 18, such that the preheater 18, preferably, a rotary air preheater, receives air that has already been heated in the heat exchanger 52.

Since the combustion air preheater 18 now receives air at a higher temperature than before the bottom ash heat recovery, the combustion air preheater 18 may need some kind of an adjustment. If the combustion air preheater 18 were kept the same, it would not be able to cool down the flue gas temperature as efficiently as before the bottom ash heat recovery, and some heat contained in the flue gases might be lost. Thus, in practice, to be able to recover heat from the flue gases as efficiently as before (equal to maintaining the flue gas temperature after the combustion air preheater the same as before the bottom ash heat recovery), a more efficient combustion air preheater is needed.

FIG. 2 also shows additional equipment arranged in both the cooling circuit 42, and the heating circuit 48. Optionally, the bottom ash cooling circuit 42 is provided with a second heat exchanger 54 connected to the side of (or in parallel with) the first heat exchanger 46. In practice, the cooling water coming from the bottom ash cooling device 38 is divided, in this additional embodiment, by means of a valve (not shown) between the two heat exchangers 46 and 54, depending on the amount of heat needed for heating the combustion air. Whenever more heat from the bottom ash is recovered, or should be taken to ensure a low enough temperature of the bottom ash in its discharge than needed in the combustion air preheating, a portion of the cooling water flow is guided to the second heat exchanger 54, so that the excess heat is transferred by the second heat exchanger 54 from the cooling water circuit 42 to another cooling water circuit 56. In other words, the operation of the valve (not shown) opening the cooling water flow path to the second heat exchanger 54 is, preferably, controlled by at least one of the temperature of the bottom ash in its discharge to the hopper 58, the temperature of the combustion air exiting the heat exchanger 52, the temperature of the cooling water after the heat exchanger 46, and the temperature of the combustion air exiting the combustion preheater 18. This connection ensures a low enough temperature for the bottom ash discharged in the hopper 58. The heating circuit 48 is also provided with a second heat exchanger 60, in addition to the first one 52, for heating the combustion air. The second heat exchanger 60 is arranged in series with the first heat exchanger 52 for providing the heating circuit 48 with additional heat for heating the combustion air. The heat exchanger 60 may, for instance, be used in start-up or partial load situations when neither the flue gas heat recovery nor the bottom ash heat recovery, nor such together, are able to provide a sufficient amount of heat for the heating of the combustion air. The use of the second heat exchanger 60, i.e., the steam flow therein, may preferably, but not necessarily, be controlled by at least one of the temperature of the flue gases upstream of the combustion air preheater 18, the temperature of the bottom ash in its discharge to the hopper 58, the temperature of the combination air exiting the heat exchanger 52, and the temperature of the combustion air exiting the combustion air preheater 18.

Another option for arranging the heat exchanger in the cooling circuit is to position the heat exchanger 54 of the second cooling circuit 56 in series with (and not in parallel to) the heat exchanger 46 of the first cooling circuit 42. This connection functions, in practice, so that the hot water from the bottom ash heat recovery arrangement 38 first heats the water in the combustion air heating circuit 48 by the heat exchanger 46, and then, further flows to the heat exchanger 54 to be cooled further, whereafter, the water is returned to the bottom ash heat recovery arrangement 38 by means of the pump 44.

Figure 3:
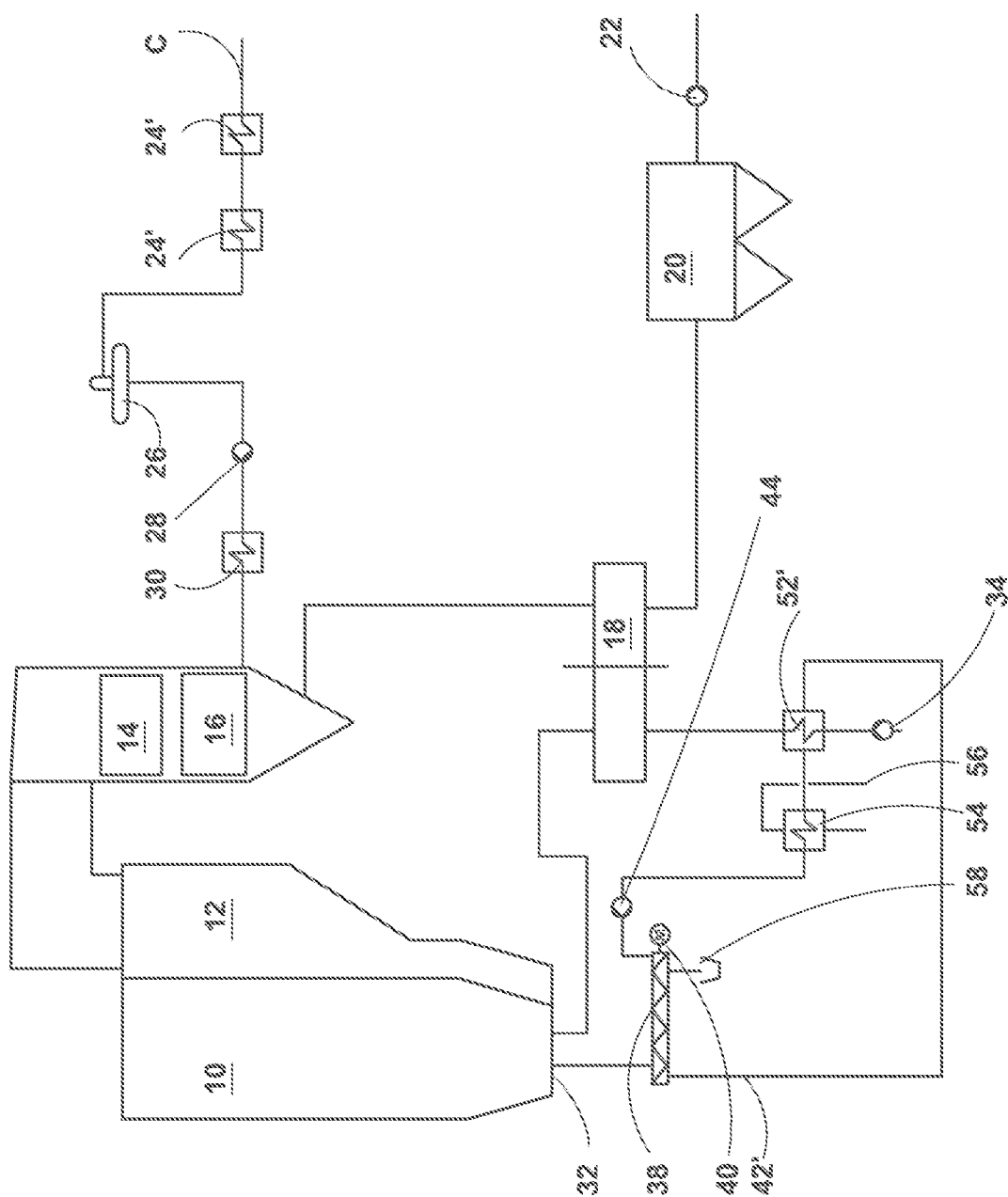
FIG. 3 is a schematic representation of a second preferred embodiment of the present invention, arranged in connection with a circulating fluidized bed boiler.

FIG. 3 illustrates a bottom ash heat recovery arrangement in accordance with a second preferred embodiment of the present invention. In fact, the embodiment of FIG. 3 is a simplification of the embodiment of that shown in FIG. 2. Here, the bottom ash cooling circuit 42 and the combustion air heating circuit (of the embodiment shown in FIG. 2) have been combined into a single circuit 42', such that the bottom ash cooling water is taken to heat the combustion air directly in the heat exchanger 52'. The circuit 42' includes the additional cooling water circuit 56 with its heat exchanger 54 in the manner of the embodiment of FIG. 2. Naturally, as already discussed above, an additional heat exchanger (for instance, heat exchanger 54) arranged in a certain circuit (42, 42') for cooling the heat exchange medium in the specific circuit (42, 42') may be arranged either in series or in parallel with the heat exchanger (46, 52') used for heating a heat exchange medium in another circuit, or the combustion air directly. The cooling/heating circuit 42' need not be provided with the heat exchanger 60 of FIG. 2, but a corresponding heat exchanger may be arranged in the combustion air line, either before or after heat exchanger 52', for the start-up and partial load situations when this is the only way of heating the combustion air.

Figure 4:
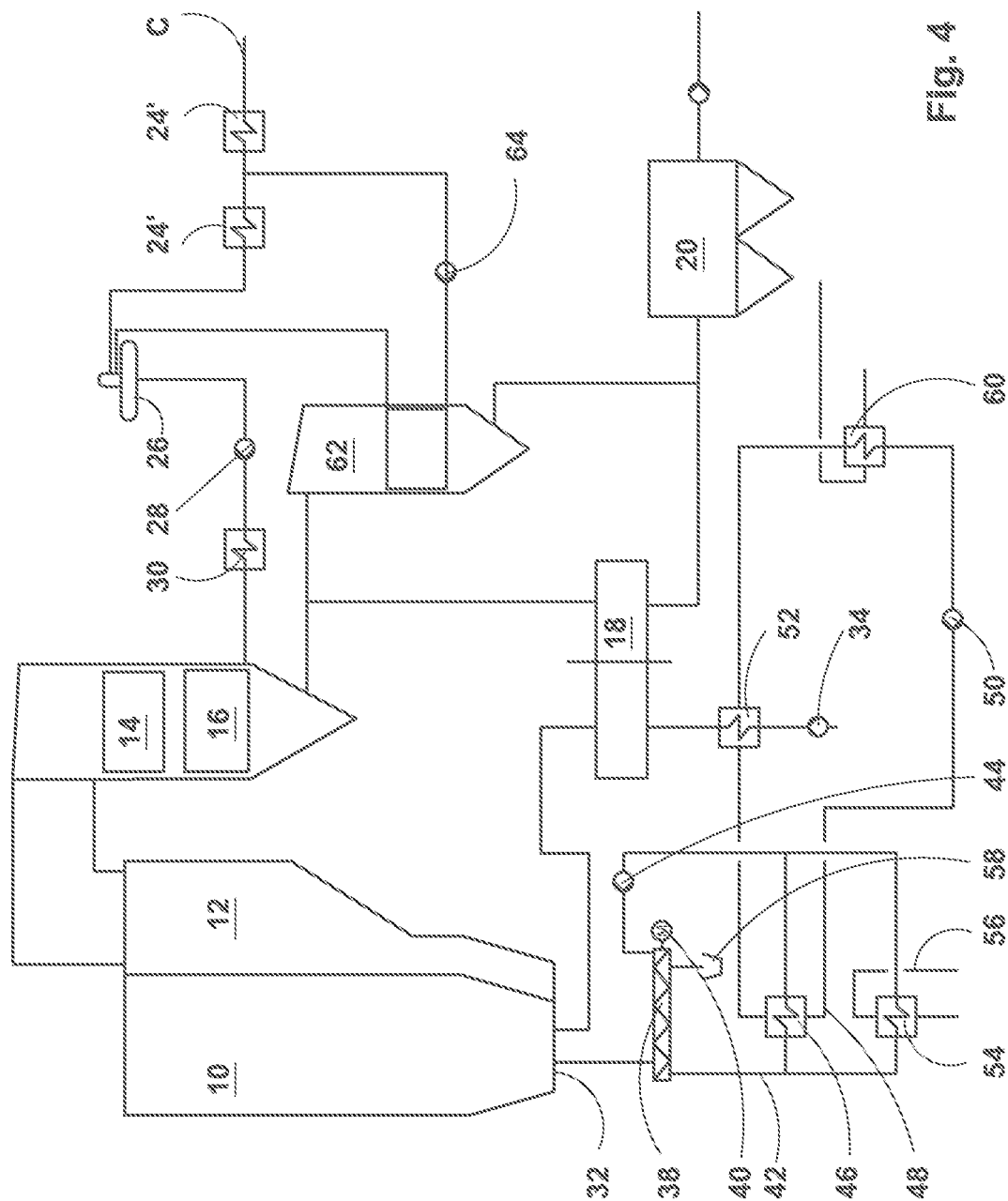
FIG. 4 is a schematic representation of a third preferred embodiment of the present invention, arranged in connection with a circulating fluidized bed boiler.

FIG. 4 illustrates a bottom ash heat recovery arrangement in accordance with a third preferred embodiment of the present invention. As can be seen from FIG. 4, the main arrangement is the same as that shown in FIG. 2. The only exception is that a bypass economizer 62 has been added in the flue gas path between the economizer 16 and the electrostatic precipitator/bag filter 20, in parallel with the combustion air preheater 18. The bypass economizer 62 is used for preheating the condensate by means of connecting it to the condensate C flow path between the low-pressure preheaters 24', such that a portion of the condensate is made to flow by means of pump 64 via the bypass economizer 62 to the feed water tank 26, whereby the economizer 62 may as well be called a condensate preheater. Here, it has to be understood that there are several options for the condensate flow, in relation to the bypass economizer 62. As has already been discussed earlier, there may be only one condensate preheater, or more than two preheaters, before the feed water tank. Thereby, it is obvious that the condensate flow to the bypass economizer 62 may be taken already before the first preheater, between the preheaters (as shown in FIG. 4), or after the preheaters. Another option for the use of the bypass economizer 62 is to connect it in parallel with the high pressure preheater 30. And, naturally, a third option is a combination of the above two options, i.e., to circulate both the low-pressure and the high-pressure condensate in the bypass economizer 62. It is even possible that the entire condensate flow is heated in the bypass economizer 62, with or without one or more preheaters arranged in series with the economizer, before the feed water tank.

The reason why the condensate preheater/bypass economizer 62 is used is the fact that, sometimes, while using the bottom ash heat recovery arrangement of FIG. 2, the combustion air preheater may not be able to reduce the flue gas temperature sufficiently, but the temperature remains excessively high (wasting heat energy). The ultimate cause is that, due to the heat exchanger 52, the difference between the temperature of the flue gas entering the combustion air preheater 18 and that of the combustion air exiting it is decreased. To maintain the flue gas temperature at an acceptably low level after the combustion preheater 18, a portion of the flue gases is taken to the condensate preheater 62, instead of the combustion air preheater 18, whereby the heat duty of the combustion air preheater 18 is reduced, and the flue gas temperature after the air preheater 18 is maintained the same or lower, as before the new bottom ash heat recovery arrangement. Alternatively, in some applications, it may be preferable to arrange an additional economizer in series with the air preheater 18, either upstream or downstream of the air preheater.

The embodiments of the present invention discussed above offer a number of different ways to control both the temperature of the bottom ash exiting the cooling arrangement and the heating of the combustion air in the preheater 18. Naturally, the controls discussed in connection with the embodiment of FIG. 2 are applicable here, too, but since the bypass economizer 62 is taken into use, its controls have to be made compatible with the one discussed in FIG. 2. In other words, the valve (not shown) governing the flue gas introduction to the bypass economizer 62 may be controlled by the temperature of the flue gases exiting the combustion gas preheater 18. In other words, the higher the temperature of the flue gases exiting the combustion air preheater 18, the larger the portion of the flue gases allowed to enter the bypass economizer 62. The condensate C flow to the bypass economizer 62 also has to be controlled. One feasible way of controlling this is to make the condensate flow to the bypass economizer 62 dependent on the flue gas flow into the economizer 62. And, finally, both the bottom ash temperature after cooling thereof, the combustion air preheating, and the temperature of the flue gas entering the stack should be controlled such that the energy losses are kept minimal.

Figure 5:
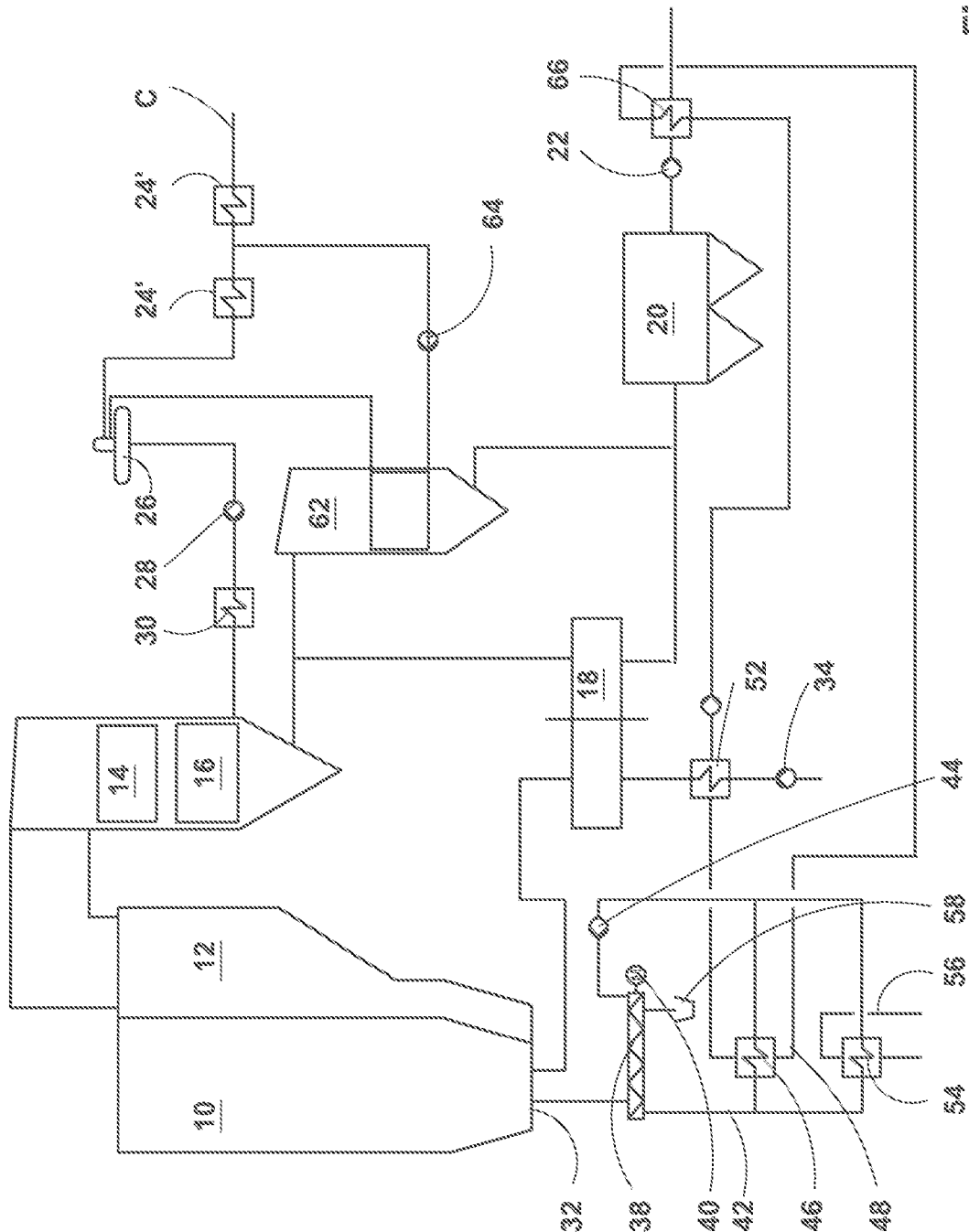
FIG. 5 is a schematic representation of a fourth preferred embodiment of the present invention, arranged in connection with a circulating fluidized bed boiler.

FIG. 5 illustrates a bottom ash heat recovery arrangement in accordance with a fourth preferred embodiment of the present invention. The arrangement of FIG. 5 is a further development of the arrangement discussed in FIG. 4. The starting point in this embodiment of the present invention is that some boiler plants are designed to recover heat from flue gases after the electrostatic precipitator 20 for heating the combustion air. Thus, such a known arrangement consists of a water circuit comprising a flue gas cooler 66 located after flue gas fan 22 and a combustion air heater 52 located after combustion air fans 34 in the combustion air flow path. Now, the above-mentioned known arrangement has been connected to the combustion air heating circuit 48 that utilizes the heat recovered from the bottom ash by means of the cooling circuit 42 as has already been discussed above. Heat from both the bottom ash cooling means 38 (with heat exchanger 56) and the flue gas heat recovery means 66, i.e., the flue gas cooler is exchanged to combustion air heating circuit 48. If it is desired that the heat recovery by means of the flue gas cooler 66 is maintained at the same level as before the new bottom ash heat recovery connection, it means that the combustion air temperature before the combustion air preheater 18 rises. The combustion air temperature after the combustion air preheater 18, however, is not able to rise equally, since only a certain difference in temperatures of flue gas entering the combustion air preheater 18 and the combustion air exiting it may exist. This is compensated for by decreasing the flue gas flow through the combustion air preheater 18 and increasing the flue gas flow through the bypass economizer 62, whereby, the heat duty of the air preheater 18 is decreased and the heat duty of the bypass economizer 62 is increased, respectively.

In view of description above, it has to be understood that only a few most preferred embodiments of the present invention have been discussed. Thus, it is obvious that the invention is not limited only to the embodiments discussed above, but that it can be modified in many ways within the scope of the appended claims. It also has to be understood that features of a specific embodiment of the invention may be applied in connection with the features of other embodiments, within the basic idea of the present invention, or that features from different embodiments may be combined to result in a working and technically feasible constructions. In other words, it is obvious that the additional heating means 60 arranged in the combustion air heating circuit in the embodiment of FIGS. 2, 3, and 4 may also be utilized in the embodiment of FIG. 5. Likewise, the utilization of the heat recovered from the bottom ash may not only be used in heating the combustion air, but also, other applications within the boiler arrangement or the power plant are possible. It is, for instance, possible to use the heat for heating the condensate. Further applications relate to using the recovered heat for heating the power plant building, or delivering the heat for district heating purposes. Also, it is possible to connect the heat exchanger 66, recovering heat from the flue gases after the electrostatic precipitator from the embodiment of FIG. 5, to the embodiments of FIGS. 2, 3, and 4, to bring additional energy to the combustion air heating circuit 48 or the bottom ash cooling circuit (42'), provided that it has been ensured that the connection has been done, so that it does not complicate the bottom ash cooling, i.e., by means of connecting the flue gas heat recovery in parallel with the bottom ash cooling device. Further, it has to be understood that the heat exchanger 52 used for heating the combustion air may be positioned upstream of the fans 34, and not necessarily thereafter. And, finally, it should be understood that the word "condensate" should be understood broadly also to cover such water returning to the boiler arrangement that has not been in a gaseous state (i.e., steam), but has been hot water that has been cooled down in use. Further, it has to be understood that the heat exchanger 52 used for heating the combustion air may be positioned upstream of the fans 34, and not necessarily thereafter. And, finally, it should be understood that the word "condensate" should be understood broadly also to cover such water returning to the boiler arrangement that has not been in a gaseous state (i.e., steam), but has been hot water that has been cooled down in use.

The invention claimed is:

1. A method of recovering heat from bottom ash that is discharged from a combustion process in a furnace, the method comprising:
   feeding fuel and combustion air into a furnace for combusting the fuel, in order to generate heat energy to produce at least one of steam and hot water in a boiler arrangement, in which flue gases and bottom ash are generated;
   discharging the bottom ash from the furnace;
   recovering heat from the flue gases;
   recovering heat to a bottom ash cooling circuit from the bottom ash discharged from the furnace in order to utilize the recovered heat for preheating the combustion air in a heat exchanger;
   arranging the heat exchanger in a combustion air heating circuit; and
   exchanging the heat from the bottom ash cooling circuit to the combustion air heating circuit.

2. The method as recited in claim 1, further comprising preheating the combustion air in the heat exchanger before the combustion air is preheated by the heat recovered from the flue gases.

3. The method as recited in claim 1, further comprising separating solids from the flue gases in an electrostatic separator.

4. The method as recited in claim 3, further comprising recovering the heat from the flue gases, after the electrostatic precipitator, for heating the combustion air.

5. The method as recited in claim 3, further comprising recovering the heat from the flue gases, after the electrostatic precipitator, into one of the bottom ash cooling circuit and the combustion air heating circuit for heating the combustion air.

6. The method as recited in claim 3, further comprising recovering the heat from the flue gases, after the electrostatic precipitator, into the combustion air heating circuit for heating the combustion air.

7. The method as recited in claim 1, further comprising arranging an additional cooling device in the bottom ash cooling circuit.

8. The method as recited in claim 1, further comprising arranging an additional heating device in the combustion air heating circuit.

9. The method as recited in claim 1, wherein the bottom ash cooling circuit comprises a bottom ash water cooling circuit.

10. An arrangement for recovering heat from bottom ash that is discharged from a combustion process in a furnace of a boiler arrangement, in which fuel is combusted for generating heat to produce at least one of steam and hot water, and flue gases and bottom ash are generated, the arrangement comprising:
    a furnace for combusting fuel with combustion air, in order to generate heat energy to produce at least one of steam and hot water in a boiler arrangement, in which flue gases and bottom ash are generated;
    a feed for feeding combustion air into the furnace;
    a feed for feeding fuel into the furnace;
    a discharge for discharging the bottom ash from the furnace;
    a recovery device for recovering heat from the flue gases;
    a bottom ash cooling circuit adapted to recover heat from the bottom ash, the bottom ash cooling circuit including a heat exchanger; and
    a combustion air heating circuit that receives heat from the heat exchanger of the bottom ash cooling circuit, the combustion air heating circuit including a heat exchanger for heating the combustion air.

11. The arrangement as recited in claim 10, wherein the combustion air heating circuit includes a device for heating the water in the circuit.

12. The arrangement as recited in claim 10, further comprising an additional heat exchanger that is arranged in the bottom ash cooling circuit for recovering heat from the flue gases after an electrostatic precipitator, which is a final solids separation device.

13. The arrangement as recited in claim 12, wherein the additional heat exchanger is arranged after the electrostatic precipitator.

14. The arrangement as recited in claim 13, further comprising an additional heat exchanger that is arranged in the bottom ash cooling circuit for recovering heat from the flue gases after the electrostatic precipitator.

15. The arrangement as recited in claim 10, further comprising an additional heat exchanger that is arranged in the combustion air heating circuit for recovering heat from the flue gases.

16. The arrangement as recited in claim 10, wherein the bottom ash cooling circuit includes a device for cooling the water in the circuit.

17. The arrangement as recited in claim 10, wherein the bottom ash cooling circuit includes one of a cooled transport screw, a water-cooled drum cooler, and a water-cooled scraper conveyer.

18. The method as recited in claim 10, wherein the bottom ash cooling circuit comprises a bottom ash water cooling circuit.

* * * * *